United States Patent [19]
Mecham

[11] Patent Number: 5,839,353
[45] Date of Patent: Nov. 24, 1998

[54] PISTON FOR A HYDRAULIC RAM AND THE LIKE AND METHOD FOR ITS ASSEMBLY ONTO A PISTON ROD

[76] Inventor: Lynn Mecham, 546 W. 800 South, Alpine, Utah 84003

[21] Appl. No.: 878,630

[22] Filed: Jun. 19, 1997

[51] Int. Cl.$^6$ ............................................. F16J 1/00
[52] U.S. Cl. ................................................... 92/258
[58] Field of Search ............................... 92/257, 258, 255

[56] References Cited

U.S. PATENT DOCUMENTS

| | | | |
|---|---|---|---|
| 2,998,288 | 8/1961 | Newhouse | 92/240 |
| 3,053,596 | 9/1962 | Farmer et al. | 92/258 |
| 3,457,842 | 7/1969 | Tennis | 92/257 |
| 3,563,508 | 2/1971 | DeLorenzo | 92/257 |
| 3,785,253 | 1/1974 | Sandau | 92/258 |

FOREIGN PATENT DOCUMENTS

| | | | |
|---|---|---|---|
| 812536 | 4/1959 | United Kingdom | 92/258 |

*Primary Examiner*—F. Daniel Lopez
*Attorney, Agent, or Firm*—M. Reid Russell

[57] ABSTRACT

A piston of a hydraulic ram, actuator or the like for fitting onto an end section of a straight rod with the assembly for fitting into to travel along a center cavity of a cylinder under the urgings of fluid under pressure that is introduced into that cylinder, the invention consisting of a number of piston component elements including upper and lower piston halves; retaining ring sections or halves, that are for assembly as rings in retaining ring grooves that have been formed around the rod end; at least one O-ring groove that includes an O-ring seal fitted therein; a piston spacer; a seal; and a pair of piston bearings, one for fitting over each piston half. In a practice of the method of the invention to assemble a piston onto a rod end, the piston component elements are sequentially fitted together to assemble the piston Which piston assembly can be accomplished in the field by even an untrained operator using only their hands, or using a minimum hand tools, such as a screw driver. With a selection of material, such as a plastic aluminum or steel compound, based upon the material's shear strength, for manufacture of the piston retaining ring halves, the assembled piston can be programmed to fail under a design fluid pressure. Upon which failure the piston will slide freely along the rod, releasing an applied fluid pressure before damage can occur to the rod, hydraulic cylinder or mountings.

19 Claims, 7 Drawing Sheets

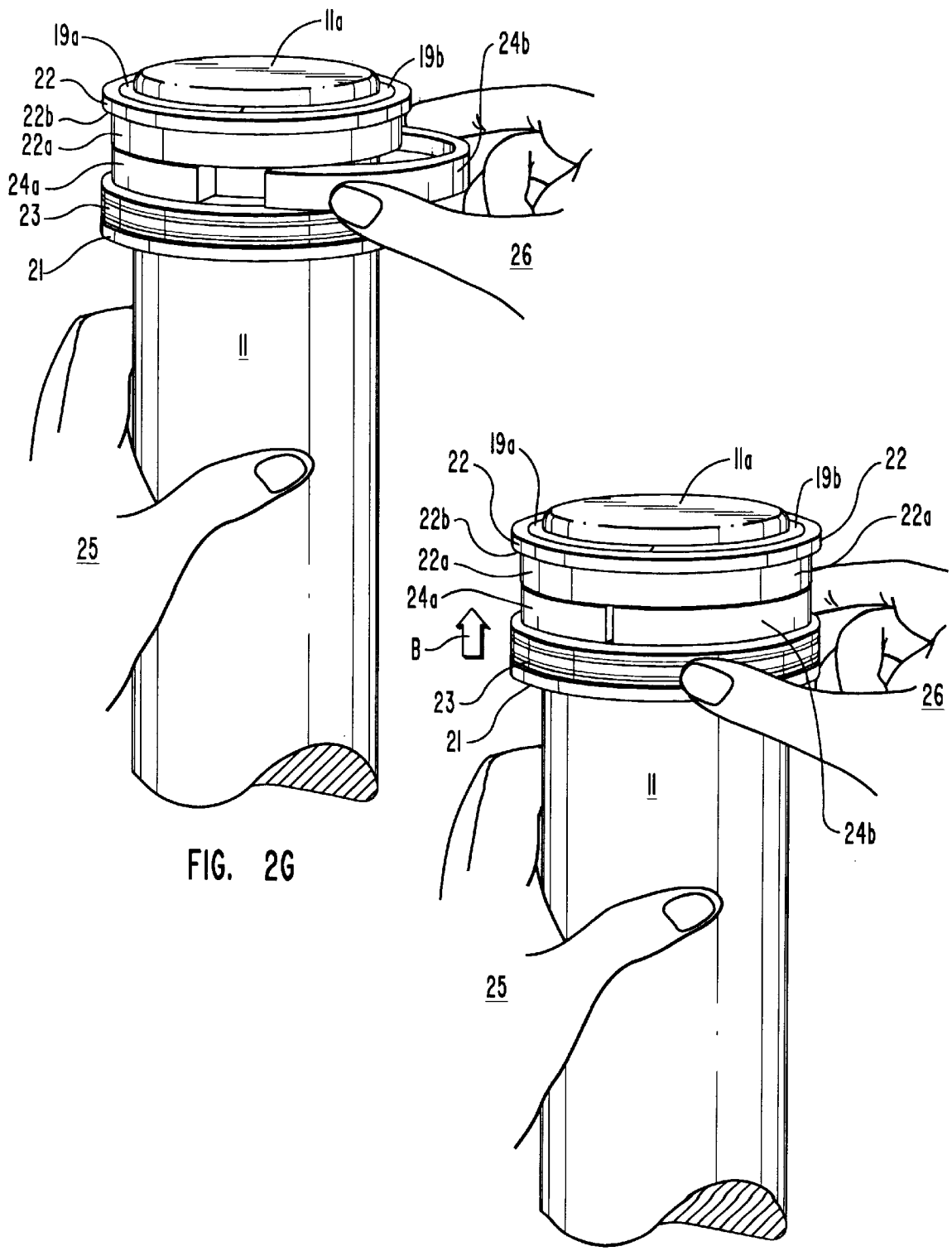

PISTON FOR A HYDRAULIC RAM AND THE LIKE AND METHOD FOR ITS ASSEMBLY ONTO A PISTON ROD

BACKGROUND OF THE INVENTION

1. Field of the Invention

This invention relates to replaceable pistons and methods for their installation as a piston end of a rod that is for use in a hydraulic cylinder, ram assembly, or the like.

2. Prior Art

Pistons for installation onto ends of rods for fitting into cylinders to be moved therein under an application of fluid under pressure are well known. Such manufactured can be for small or large units and all translate an applied hydraulic force into a mechanical movement. The present invention is intended for fitting in a lifting cylinder that can handle a very heavy weight, for example a ram assembly that can be used to maintain a position of a plow blade that may be subjected to thousands of pounds of force as when that blade strikes a fixed object, or the like. Heretofore, when such piston and rod assemblies were stressed as by application of a greater than design load thereto, prior to piston failure, the rod would bend, or like damage would occur to the hydraulic cylinder or ram. Such as, for example, the assembly breaking its mounting. Further, even where a piston was designed to fail as by breaking a locking component as was used to maintain it onto a rod end, to release the rod before an applied load could bend the rod or break the cylinder away from its mounting, such shearing action was controlled by the strength of the locking component as determined by the shearing strength of the material it was manufactured usually steel, and the like. Accordingly, a design force that the piston was intended to fail at would of necessity by high, causing, in many instances, the rod to bend before the piston locking component failed. In any case, upon failure, the hydraulic cylinder or ram had to be removed and the piston and rod rebuilt in a shop setting, taking the unit out of service.

Unlike earlier piston and rod arrangements, the present invention provides a piston that is formed from a number of individual components or elements that are easily and quickly fitted together forming a piston that is mounted onto a rod end. Which piston assembly requires few, if any, handoperated tools, and can be accomplished by even minimally trained personnel in a field situation. Further, by a selection of materials as piston retaining rings are manufactured from, that connect the piston to the rod end, including; plastic, aluminum and steel, when a force is applied whereat the piston will fail, can be programmed by the selection of material from which the retaining rings are formed. With, upon failure, the piston is released to slide along the rod, minimizing a likelihood of an application of a greater than design force as could permanently damaging the piston, rod, or break a hydraulic cylinder off from its mountings.

SUMMARY OF THE INVENTION

It is a principal object of the present invention in a piston for a hydraulic ram to provide a piston that is assembled from a number of component elements that are sequentially fitted onto a rod end to form the piston, with the piston and rod then fitted to travel within a cylinder, responsive to an application of fluid under pressure.

Another object of the present invention is to provide a piston that is formed from a number of elements that are fitted sequentially onto an end section of a straight rod that has had a pair of piston retaining ring grooves formed therein, which piston elements, when fitted sequentially together onto that rod end form a piston that will engage and seal against a cylinder interior wall, to travel therealong under the urging of fluid under pressure.

Another object of the present invention is to provide individual piston elements formed to be assembled or disassembled manually into the piston using few manually operated tools, or by hand, onto a straight rod end, in a field or operational setting without a need to remove a cylinder containing the piston and rod from its mounting to an item of equipment.

Still another object of the present invention is to provide a piston assembly where, by a selection of material for manufacture of piston retaining rings that secure the piston to the rod end, with such selection from plastic, aluminum or steel materials, and the like, a desired shearing stress pressure where the piston will fail and slide along rod can be obtain, with when the retaining rings are manufactured from a plastic, the piston will fail at a lower pressure, or when aluminum is used the retaining rings will have a greater failure pressure, with, when the retaining rings are manufactured from steel, they will have a greatest failure pressure, whereby, by a selection of material for a manufacture of the retaining rings a system failure pressure limit can be built into the system to protect the rod from bending or the cylinder from breaking away from its mounting.

Still another object of the present invention is to provide a piston that is formed from a number of separate component elements that are sequentially fitted together onto a straight rod end by an operator using only his hands or with one or more manually operated tools, such as a screw driver, to provide a piston that will resist shearing to a select failure pressure whereat retaining rings thereof will shear, allowing the piston to slide along the rod, releasing fluid pressure prior to damage occurring to the assembly.

Principal features of the present invention in a piston for mounting onto a rod end that are for fitting in a hydraulic ram or hydraulic cylinder include, a straight rod formed from an appropriate metal such as steel to withstand anticipated compressive loading without bending, that has a sealing or seals such as an O-ring or O-rings fitted thereto and includes a pair of spaced parallel retaining ring grooves formed around an end thereof for mounting a piston thereto. The piston of the invention is for mounting to the rod end, with piston retaining rings for fitting in the parallel retaining ring grooves. Along with the piston retaining rings, the piston components include a pair of piston bearings, each for fitting onto each of a pair of top and bottom piston halves and including a piston spacer that is preferably a pair of half rings, and is to fit between and separate the piston top and bottom halves. Each of which piston top and bottom halves to include sent one of the pair of retaining rings, and a piston seal is fitted over or may be formed as a part of the piston spacer. Which piston seal has an outer surface to seal against a cylinder cavity wall, and accordingly is preferably formed from a plastic material, such as a polyurethane. The piston assembled to the rod end, are for fitting into to travel within a hydraulic cylinder that is arranged to receiving fluid under pressure that acts on the piston end top face to move it and the connected rod within the cylinder.

By a selection of a material for the pair of retaining rings, to be either a plastic, aluminum, steel, or other appropriate material, the assembled piston can be formed to fail at a design compressive load with, upon failure, the piston will slide along the rod, releasing the applied pressure before the rod can bend or a cylinder mounting to an item of equipment will fail.

A fitting together of the piston component elements can be performed manually or using simple hand tools only, even in a field setting, whereby an operator or mechanic can restore operability of a piece of equipment without a necessity of taking the assembly to a shop setting, and with a minimum of equipment down time.

These and other objects and features of the invention will become more clear with respect to the following drawings and description of the invention.

THE DRAWINGS

In the drawings that represent the best mode presently contemplated for carrying out the invention.

FIG. 1 is a exploded side elevation perspective view of the invention in a piston exploded apart from an end of a straight rod;

FIG. 2A is a profile perspective view of the rod end showing a first step in assembly the piston elements together, onto the rod end, with a pair of parallel spaced relating ring grooves shown as having been formed in the rod end, with a pair of spaced O-rings in O-ring grooves fitted between which retaining ring parallel grooves, and showing a pair of lower retaining ring halves being fitted into the lower retaining groove as a lower piston retaining ring;

Figures 2A, 2B:
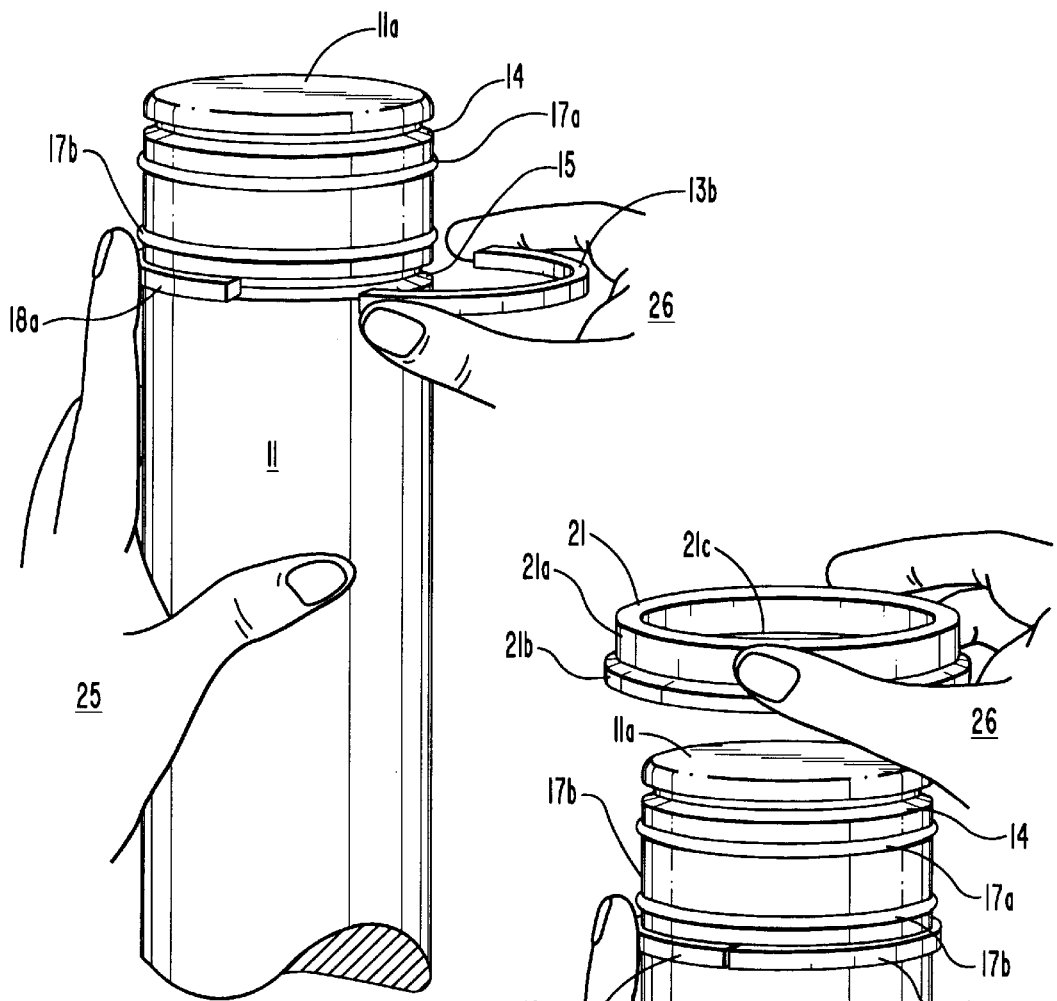
FIG. 2B is a view like that of FIG. 2A only showing a second step in piston assembly where a lower piston half is fitted onto the rod end.
Figures 2C, 2D:
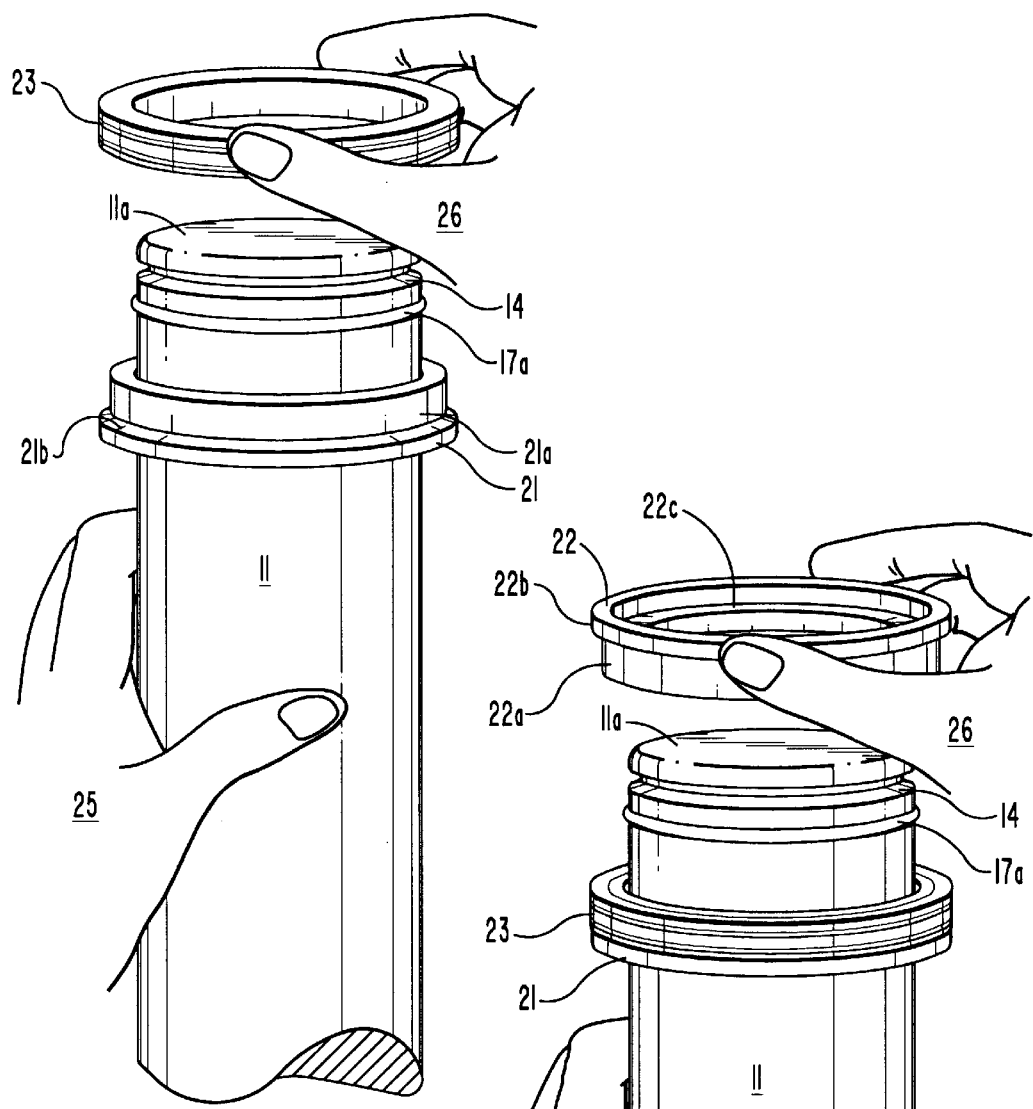
FIG. 2C is a view like that of FIG. 2B only showing the lower piston half as having been slid downwardly with a lower inner groove therein fitted over to seat the lower piston retaining ring, and showing a seal aligned for fitting over the rod top end.
FIG. 2D is a view like that of FIG. 2C only showing the seal as having been slide downwardly along the rod end and fitted over an inwardly stepped section of the lower piston half, and showing an upper piston half aligned for fitting over the rod end.
Figure 2E:
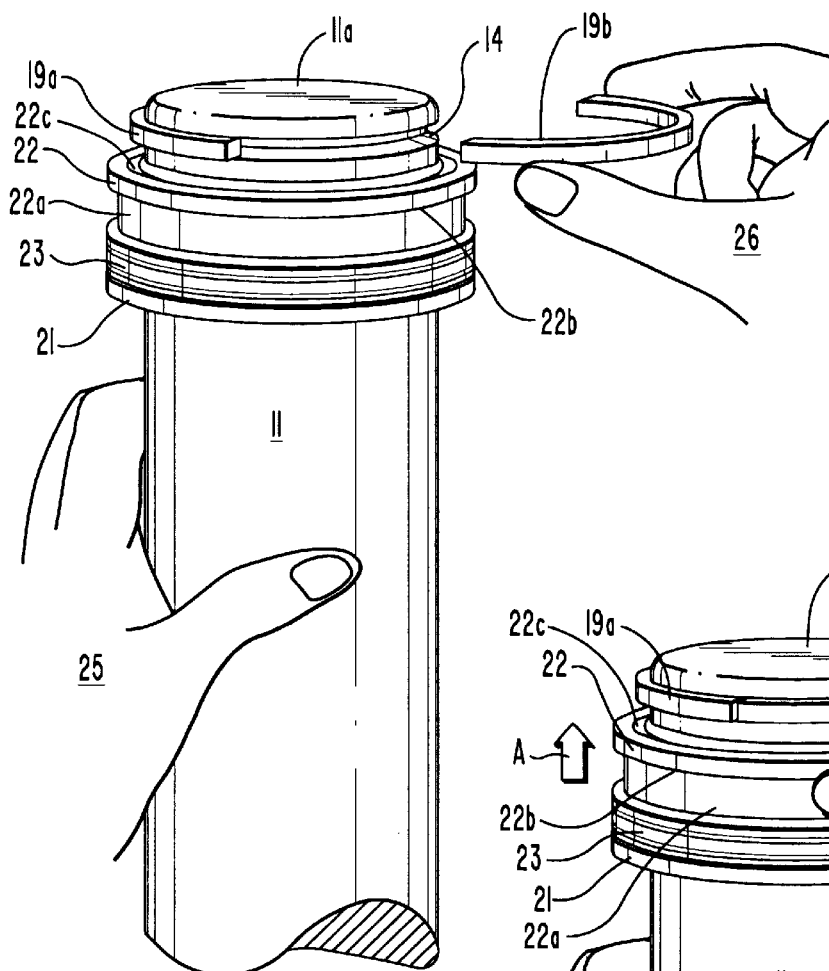
FIG. 2E is a view like that of FIG. 2D only showing the upper piston half as having been slide downwardly along the rod end engaging the seal, and showing top piston retaining ring halves as being fitted into the rod end top retaining ring groove.
Figure 2F:
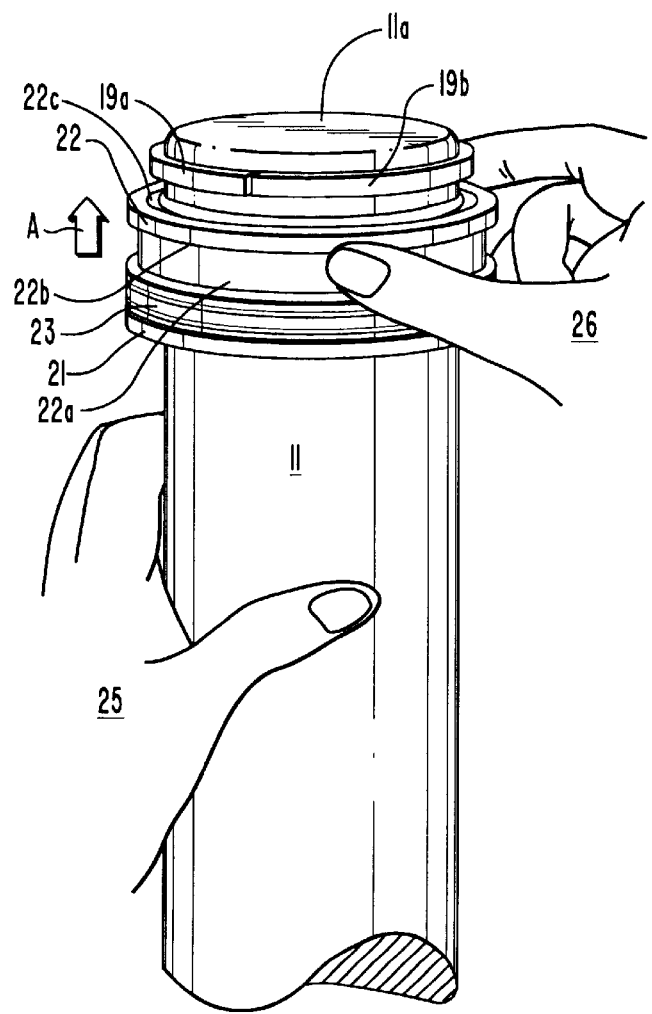
FIG. 2F is a view like that of FIG. 2E only showing by arrow A the upper piston half being elevated to where an upper groove therein fits over to seat the upper piston retaining ring.
Figures 2I, 2J:
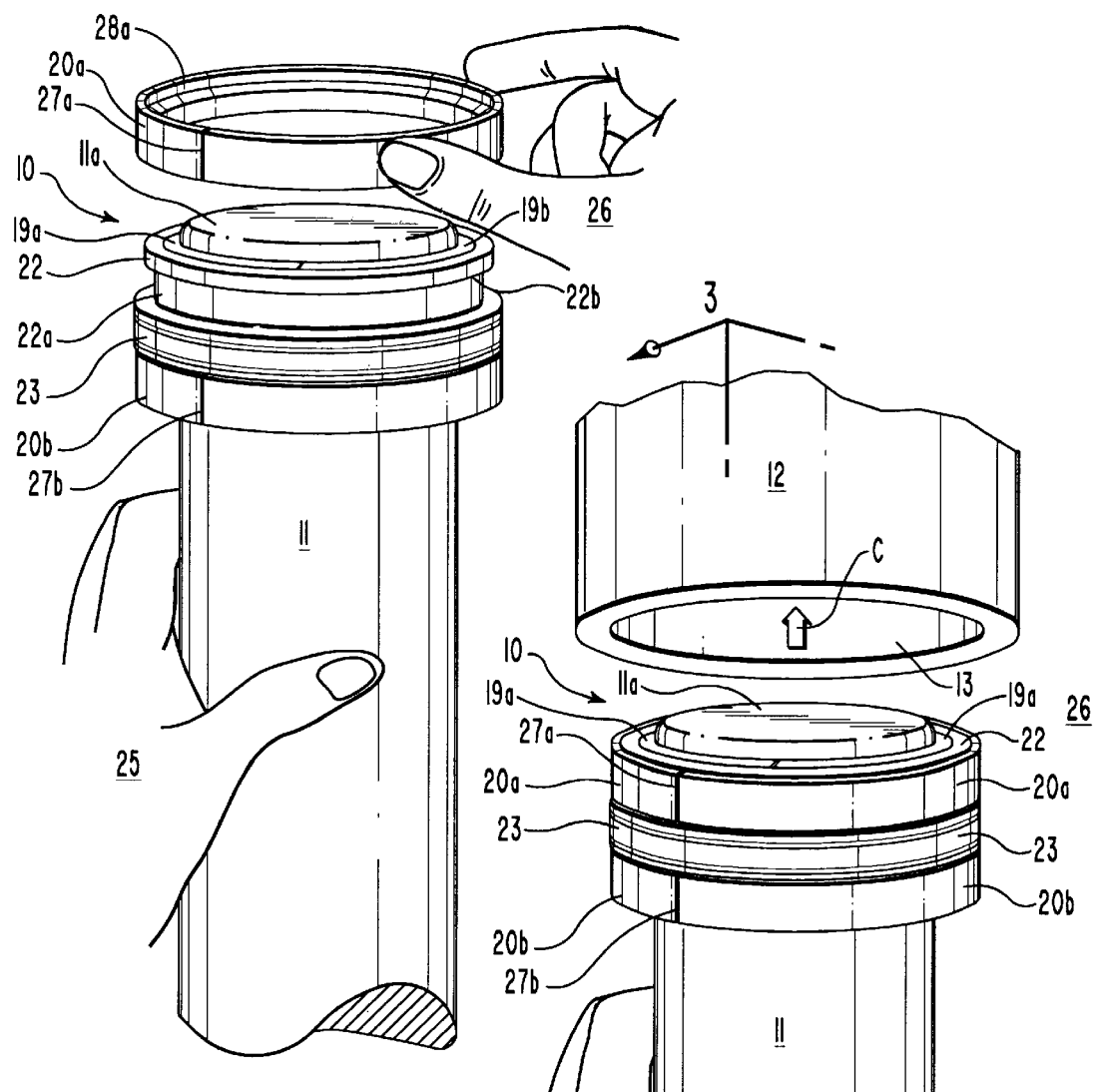
FIG. 2G is a view like that of FIG. 2F only showing the upper piston half as having been slid over the upper piston retaining ring, and showing a piston spacer, that is formed as a pair of ring halves, being fitted between the upper piston half and the seal.
FIG. 2H is a view like that of FIG. 2G only showing, with an upwardly pointing arrow B, the seal being elevation over the piston spacer.
Figure 3:
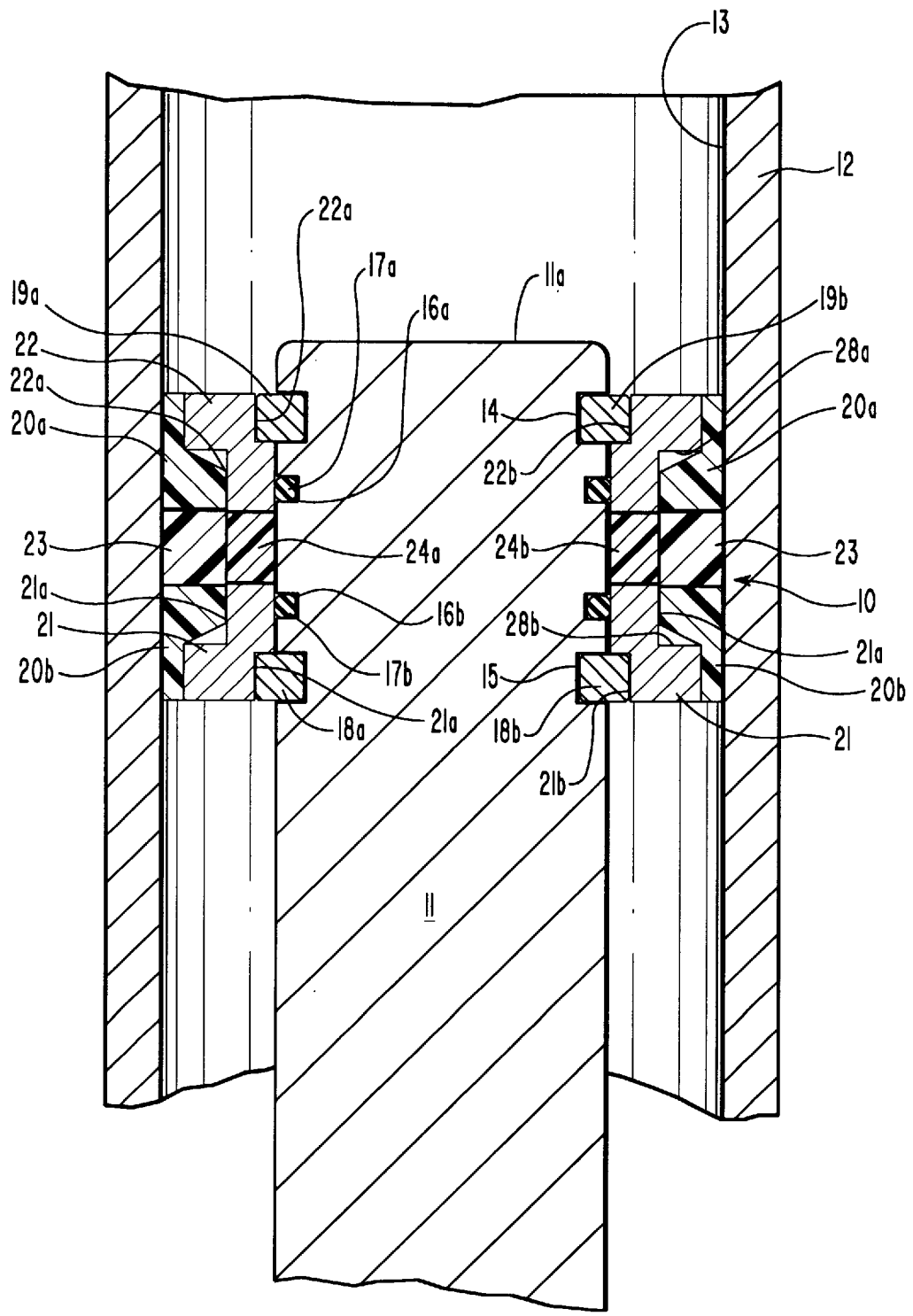

FIG. 2I is a view like that of FIG. 2H only showing a lower piston bearing as having been slide upwardly along the rod to a position over the lower piston half, and showing an upper piston bearing being fitted over the upper piston half, with the respective bearings each having a slot formed thereacross that allows them each to be flexed open at that slot so the bearing can be passed over the respective piston halves, completing the piston assembly onto the rod end;

FIG. 2J is a view of the completed piston assembly of FIG. 2I aligned for fitting into a longitudinal cavity of a hydraulic cylinder; and FIG. 3 is a longitudinal cross section taken along the line 3—3 of FIG. 2J.

DETAILED DESCRIPTION

Figure 1:
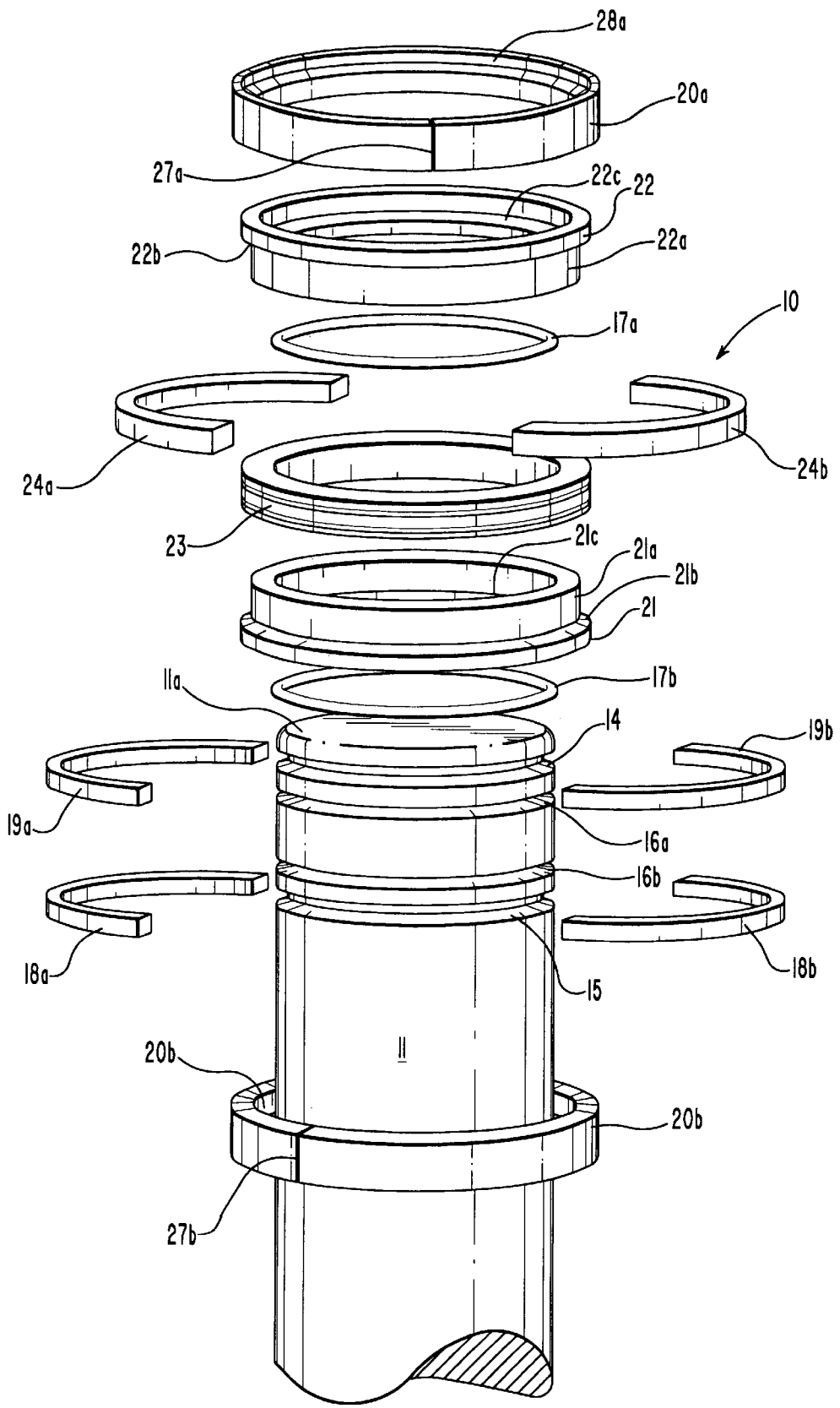

FIG. 1 shows the invention in a piston 10 for mounting to a rod end 11 of a hydraulic cylinder, actuator, ram, or the like exploded away from the rod end 11. In FIG. 2J, the assembled piston 10 is shown aligned with an open end of a longitudinal cavity 13 of a cylinder 12 that should be taken as a cylinder for a hydraulic cylinder, actuator, ram, or the like. With a sectional view of FIG. 3, the piston 10 and rod end 11 fitted into the longitudinal cavity 13 of cylinder 12, that is a hydraulic ram, hydraulic cylinder, actuator or the like. While not shown, the cylinder 12 should be taken as being connected to a source of fluid under pressure that enters the cylinder to act upon the piston 10, with the cylinder 12 and opposite rod end, not shown, secured to an item of equipment. So arranged, the piston 10 and rod end 11 are moved within the cylinder 12, to move the opposite rod end, that, for operation as a hydraulic ram, is mechanically connected to maintaining positioning of an item such as a snow plow blade. Or to extend or retract the rod end into or out of the cylinder, functioning as a single or double acting piston, which functioning is dependant upon whether the fluid under pressure is directed against the piston top only, as in a single acting piston, or whether it is also introduced into the cylinder below the piston 10, for a double acting piston.

To provide rod travel, the opposite rod end to piston 10 end is preferably fitted through a packing that is mounted in the cylinder end, not shown, and includes an appropriate coupling, such as a hole formed therethrough, for connection to an item, not shown, whereby piston 10 travel moves the connected item also.

The piston 10 is shown in the exploded view of FIG. 1, with its component elements aligned for assembly and mounting onto the rod end 11. Which piston 10 component elements are to be fitted over a rod end flat top surface 11a that preferably has been chamfered around its junction to the rod end cylindrical outer surface to facilitate the piston component elements fitting thereover, as shown in FIGS. 2A through 2J. The piston 10 is formed from a number of separate component elements that are sequentially joined or fitted together, as illustrated in FIGS. 2A through 2J, to form the piston 10, as shown completed in FIGS. 2J and 3. To provide this assembly, as shown in the figures, the rod end 11 includes a pair of parallel top and bottom piston retaining ring grooves 14 and 15, that are formed respectively, around the rod end. The piston retaining ring grooves are to receive upper and lower piston retaining ring halves 19a and 19b and 18a and 18b, respectively, that align to form retaining rings for seating in the respective retaining ring grooves for securing the piston 10 onto the rod end 11, as described in detail hereinbelow. Further, as shown best in FIGS. 1, 2A, 2B and 3, the rod end 11 additionally includes at least one and preferably a pair of O-ring grooves 16a and 16b that are formed around the rod end, that are spaced apart and parallel, and are located between the top and bottom retaining ring grooves 14 and 15, for receiving an O-ring 17a and 17b in each groove. The respective O-rings 17a and 17b, as shown in FIG. 2A, extend slightly above the rod end surface to engage the surface of a longitudinal cavity formed through the assembled piston 10, and to seal against a wall of the cylindrical longitudinal cavity 13, sealing the opposing surfaces so as to prohibit a passage of fluid under pressure therebetween.

Shown in FIG. 1 and 2I, a first step in assembling the piston 10 onto rod end 11, includes fitting a lower piston bearing 20b onto that rod end and sliding it to position below the lower piston retaining ring groove 15. Depending upon the arrangement of the opposite rod end, not shown, if that lower bearing 20b can be fitted over the opposite rod end, not shown, and slid therealong after assembly of the other piston components, then the lower bearing need not be fitted over the rod end 11 until it is needed, as set out below with respect to a description of FIG. 2I. Shown in FIG. 2A, with the respective O-rings 17a and 17b installed in the O-ring grooves 16a and 16b, an operator holding the rod end 11 in their one hand, shown herein as their left hand 25, and with their other hand, shown herein as their right hand 26, the lower piston retaining ring halves 18a and 18b are fitted into the bottom piston retaining ring groove 15. It should, of course, be understood that, whether the operator is right or left handed governs which hands are used in practicing each of the assembly steps. Shown in FIG. 2B, the operator, as with one or more of their fingers, holds at least one of which retaining ring halves in the bottom retaining ring groove 15 and fits a lower piston half 21 over a top 11a of the rod end 11, and passes that lower piston half 21 along the rod end until the inner surface thereof passes over the seated lower piston retaining ring halves 19a and 19b have formed a ring that come to rest in a continuous groove 21c that is formed around the bottom of the lower piston half 21 inner surface, across from a right angle wall 21b, as shown in FIG. 1. Thereafter, as shown in FIG. 2C, the operator holding the rod end 11 with their left hand, fits a seal 23, that is maintained in their right hand 26, over the top 11a of rod end 11. Still shown in FIG. 2D, that seal 23 is passed along the rod end 11 until it rests in an outwardly stepped portion 21a of the lower piston half 21, which stepped portion terminates in a right angle to a wall 21b that extends outwardly from a piston half 21 edge. The operator then fits an upper piston half 22, held their right hand 26, over the top 11a of rod end 11 and, as shown in FIG. 2E, slides that upper piston half 22 along the rod end until, as shown, an end face edge of that upper piston half 22 engages a top surface of the seal 23.

Further shown in FIG. 2E, with the upper piston half 22 lower end face in engagement with the top surface of seal 23, the operator, installs top piston retaining ring halves 19a and 19b, respectively, in the top retaining ring groove 14, forming a ring, utilizing their hand 26. Thereafter, as shown in FIG. 2F, the operator, gripping the upper piston half 22 in their hand 26, elevates that upper piston half, as shown by arrow A, to pass over the top piston retaining ring halves 19a and 19b seated in a continuous groove 22c formed around the top of the upper piston half 22 inner surface, across from a right angle wall 22b. Thereafter, as shown in FIG. 2G, with the upper piston half 22 seated over the seated piston retaining ring halves 19a and 19b, there will be a space between the lower edge of the upper piston half 22 and top surface of seal 23. Into that space, as shown, the operator, using their hand 26, fits piston spacer halves 24a and 24b therein that form a ring. Thereafter, as shown in FIG. 2H, the operator holding the rod end 11 with their hand 25 elevates the seal 23 that is held in their hand 26, as illustrated by arrow B, over the seated piston spacer halves 24a and 24b.

While separate seal 23 and piston spacer halves 24a and 24b are shown, it should be understood that, with some modifications to the assembly steps and adjustment, the seal and spacer can be combined into one unit. So arranged, such combined unit, not shown, could be fitted between the upper and lower piston halves 20 and 21, respectively, for assembling the piston 10, within the scope of this disclosure. Which changes to the combined seal and spacer and assembly steps, it should be understood, would come within the scope of this disclosure.

Shown in FIG. 2I, to complete the assembly of piston 10 on rod end 11, the lower bearing 20b, that, as set out above, has during the previous assembly steps, been maintained on the rod below the rod end 11, or, if possible, is fitted over the opposite piston end, not shown, and is then slid therealong until it is positioned below the lower piston half 21. Thereat, the lower bearing 20b, that is formed from a metal such as aluminum or bronze or a plastic such as a polypropylene as determined applied pressures. As shown, the lower bearing 20b is slotted thereacross at slot 27b, which slot is to allow the lower bearing 20b to be spread apart to allow it to be fitted over the lower piston half 21. A spreading of that lower bearing 20b allows its inner surface to pass over the step right angle wall 21b, passing therealong until an outward step 28b of the lower bearing 20b will have traveled over and the lower piston bearing closed together to seat in the stepped portion 21a of that lower piston half, as shown best in the sectional view of FIG. 3. FIG. 2I shows the lower bearing 20b as having been seated onto lower piston half 21, with the lower bearing 20b as having returned to its ring shape, fitting closely around that lower piston half 21. Whereat, the operator, holding the upper piston bearing 20a in their right hand, fits it over the top surface 11a of the rod end 11, and thereat spreads that upper piston bearing 20a, as by gripping opposite edges of a slot 27a formed thereacross. So spread, the operator slides the upper piston bearing 20a over an outer edge of a right angle wall 22b of a step 22a that is formed in the upper piston half 22. The upper piston bearing 20a travels over that right angle wall until an outwardly extending step 28a aligns with the right angle wall edge 27b of the upper piston half 22. Whereat, the upper piston bearing relaxes and returns to its ring configuration, closing the edges of slot 27a together to seat onto the upper piston bearing 20a, with the respective stepped portions 22a and 28a of the upper piston half 22 and upper piston bearing 20a fitting closely together. This step as illustrated in FIG. 2I, completes the assembly of piston 10 onto rod end 11.

In FIG. 2I, piston 10 is shown as have been mounted onto rod end 11 by a practice of the steps described above. Thereafter, as shown by arrow C in FIG. 2J, the assembly is fitted into the open end 13 of the cylinder 12 in the assembly of a hydraulic ram, hydraulic cylinder, or the like. With the piston 10 on rod end 11 fully fitted in the cylinder 12, a packing gland, or the like, not shown, is fitted to the opposite rod end and is passed into the cylinder 12. The packing gland is to support travel of the rod up and down within that cylinder 12 during operations where fluid under pressure is directed into the cylinder to act upon the piston 10. FIG. 3 shows in a longitudinal cross section the piston 10 assembled on the rod end 11 and fitted into the cylinder 12.

The piston 10 can be formed for operations at high fluid pressures, and can be designed to fail, releasing pressure, at low to high pressures, and accordingly can be used for a wide variety of applications. To provide this versatility, the invention utilizes different materials in the manufacture of the upper and lower retaining ring halves 18a, 18b, 19a and 19b, respectively. A particular manufacturing material is selected for its resistance to shearing to provide a finished assembly that will fail at a design pressure. For example, a select hard plastic, can be utilized to form the retaining ring halves for providing a piston 10 that will fail at a low pressure, with the piston retaining rings shearing at such low design pressure or the retaining ring halves can be formed from aluminum or steel to fail at higher pressures. Failure of the piston retaining rings releases the piston 10 that will then slide along the rod end 11, immediately releasing system pressure. So arranged, providing the retaining rings shearing strength is less than a pressure as could bend, or otherwise damage the rod, break the cylinder 12 coupling to an item of equipment, or rod opposite end coupling to such an item of equipment, such as a vehicle fame, a blade maintained to the rod opposite end, or the like, then a repair procedure will involve only removal of the piston and rod and disassembly of the piston component elements therefrom, and a reassembly of the piston 10 onto the rod end 11 after replacement of the piston retaining rings. Whereafter, the repaired piston 10, that is mounted onto the rod end 11, is fitted back into the cylinder 12 and the hydraulic ram, cylinder, or the like, is reassembled and reconnected to hydraulic couplings, and the assembly remounted onto the item of equipment to allow a resumption of work.

The above analysis holds true for a selection of aluminum for manufacture of the retaining ring halves 18a, 18b, 19a and 19b, where, utilizing a preferred compound of aluminum, a desired hardness or shearing stress is provided for the retaining ring halves, such that the piston 10 will fail at an application of a hydraulic pressure that is greater than that provided by a utilization a plastic in retaining ring fabrication. Likewise, a selection of a particular steel compound will provide a greater shear strength than an aluminum compound for manufacture of the retaining ring halves 18a, 18b, 19a and 19b, to produce a piston that can be operated at a greater fluid pressure before a piston failure occurs.

For a manufacturing the component elements of piston 10, other than for the piston retaining rings, described above, the piston halves 21 and 22 and piston spacer halves 24a and 24b are preferably formed from steel to essential be undeformed under hydraulic pressure. Whereas, the O-rings 17a and 17b, to provide for sealing the piston 10 onto the rod end 11, are preferably a standard resilient O-rings. Similarly, the seal 23, has an outer surface that is to flex outwardly from the piston 10 when under pressure so as to engage and seal against the cylinder 12 inner wall. The seal 23 accordingly is preferably manufactured from a stiff but flexible material, and a polyurethane material has been used successfully for the manufacture of this seal. As set out above, the piston bearings 20a and 20b are preferably formed as rings from an appropriate stiff material, such as a metal or plastic, to allow the piston bearings 20a and 20b to be spread at slots 27a and 27b, respectively. Which slots 27a and 27b, respectively, are formed across each piston bearing, allow the piston bearings to be spread to fit over the respective piston halves 21 and 22, completing the piston 10 assembly.

The piston 10, as set out and described herein above, is assembled from a number of component elements that are fitted together in sequence to mount the piston to a rod end, with the piston and rod for fitting into a conventional hydraulic cylinder that includes a packing for fitting in the cylinder and supporting rod travel up and down therein. The piston, dependant upon materials selected for manufacturing the retaining ring halves, can program a failure pressure into the piston whereat the piston will fail by a shearing of the retaining rings, freeing the piston to slid along the rod and releasing an applied fluid pressure before damage can occur to the rod, cylinder or mounts. Which piston and rod can be easily removed from the cylinder upon failure of the retaining ring halves and, after their replacement and a reassembly of the piston onto the rod, that is accomplished manually by an operator, of with a use of minimum hand tools, such as a screw driver, or the like, the piston and rod are reinstalled in the cylinder and the cylinder remounted. Which disassembly, repair and reassembly can be accomplished in the field, as required.

It should be understood that, while a preferred embodiment of my invention in an improved piston for a hydraulic ram and method for its mounting has been shown and described herein, the present disclosure is made by way of example only and that variations and changes are possible without departing from the invention subject matter, and a reasonable equivalency thereof, coming within the scope of the following claims, which claims I regard as my invention.

I claim:

1. A piston for mounting onto a straight rod comprising, upper and lower piston halves that are each formed to fit over and seat onto a cylindrical rod end with an inner surface of each said piston half formed to receive and seat a retaining ring means; a pair of retaining ring means one for seating in each said piston half and in a groove formed around said cylindrical rod end; a seal and spacer means that are separate units with said seal means consisting of a pair of ring segments that, when fitted together form a continuous ring seal having an outer surface for engaging and sealing against in inner cavity wall of a cylinder with said seal and spacer means for fitting between opposing surfaces of said upper and lower piston halves; and a pair of piston bearings each for fitting over and mounting onto each said piston half where each said seal and spacer means is arranged between opposing surfaces of said pair of piston halves.

2. A piston for mounting onto a straight rod as recited in claim 1, further including at least one seal means for arrangement between said piston and rod end to seal any gap therebetween.

3. A piston for mounting onto a straight rod as recited in claim 1, wherein the seal means outer surface is formed from a resilient plastic material to have a flexible surface for engaging so as to seal to the cylinder inner wall wherein the piston and rod are fitted.

4. A piston for mounting onto a straight rod as recited in claim 3, wherein the plastic material wherefrom the seal means outer surface is formed is a polyurethane.

5. A piston for mounting onto a straight rod as recited in claim 1, wherein each of the pair of piston bearings is a continuous ring that has been slotted thereacross, and is formed from a stiff but somewhat resilient material to allow for a spreading of each said piston bearing along its slot to allow it to be fitted over said upper or lower piston.

6. A piston for mounting onto a straight rod as recited in claim 5, wherein the piston bearings are each formed from an aluminum or steel material.

7. A piston for mounting onto a straight rod as recited in claim 5, wherein piston bearings are each formed from a hard plastic material.

8. A piston for mounting onto a straight rod as recited in claim 1, wherein the upper and lower piston halves and seal means are each formed as a continuous ring; and each of the pair of retaining rings means and the piston spacer means are formed from steel as ring segments that, when fitted together, form continuous rings.

9. A piston for mounting onto a straight rod comprising, upper and lower piston halves that are each formed to fit over and seat onto a cylindrical rod end, with an inner surface of each said piston half formed to receive and seat a retaining ring means; a pair of retaining ring means one for seating in each said piston half and in a groove formed around said cylindrical rod end; a seal and spacer means for fitting between opposing surfaces of said upper and lower piston halves; a pair of piston bearings each for fitting over and mounting onto each said piston half where said seal and spacer means is arranged between opposing surfaces of said pair of piston spacer means and each said piston half is stepped inwardly around its outer surface leaving a continuous outwardly extending lip around an upper surface, and said continuous groove formed around said piston half inner surface is to receive and seat therein one of said pair of retaining ring means that has also been seated in the groove formed around the rod end; and each of said pair of piston bearings includes a step formed around an inner wall thereof that conforms to, so as to seat onto, one of said steps formed in said outer upper surface of each of said piston halves.

10. A piston for mounting onto a straight rod as recited in claim 9, wherein the pair of retaining ring means are each formed from identical materials that are selected to provide a design shearing stress to each said retaining ring means to provide for programing retaining ring means failure at an application of a greater than design pressure of fluid acting against the piston.

11. A piston for mounting onto a straight rod as recited in claim 10, wherein the retaining ring means are manufactured from a plastic.

12. A piston for mounting onto a straight rod as recited in claim 10, wherein the retaining ring means are manufactured from an aluminum.

13. A piston for mounting onto a straight rod as recited in claim 10, wherein the retaining ring means are manufactured from steel.

14. A method for mounting a piston onto an end of a straight rod that is for assembly into a cylinder wherein fluid under pressure is introduced to move the piston and straight rod that includes a pair of parallel spaced apart upper and lower retaining ring grooves formed therearound consisting of, seating a pair of lower retaining ring segments, that, when fitted together form a ring, in a lower retaining ring groove and passing a lower piston half along the rod end to a piston over said seated lower retaining ring partial rings, fitting a circular seal over an end surface of said rod end; passing an upper piston half over said end surface of said rod end and lowering it thereon into engagement with said seal, seating a pair of lower retaining ring partial rings, in an upper retaining ring groove formed around the rod and to said upper piston half, installing a spacing ring between opposing surfaces of said upper and lower piston halves, and moving said seal along said rod to a position over said spacer, moving a lower piston bearing along said rod end to said lower piston half, and, at said lower piston half, spreading apart said lower piston bearing along opposing edges of a slot formed thereacross and passing said lower piston bearing over an outwardly projecting lip of said lower piston half, with said lower piston bearing to then spring back to close around said lower piston half; and fitting an upper piston bearing over said top surface of said rod end and spreading said upper piston bearing along opposing edges of a slot formed thereacross and passing said upper piston bearing over an outwardly project lip of said upper piston half, with said upper piston bearing to then spring back to close around said upper piston half, completing the piston mounting to said rod end; and fitting said piston and rod into a center cavity of a cylinder.

15. A method as recited in claim 14, wherein the spacing ring is formed as separate units, the spacing ring consisting of a pair of ring segments that, when fitted together form a continuous ring, and the seal is formed as a continuous ring having an outer surface for engaging and sealing against a wall of a cavity formed through a cylinder wherein the piston and rod are fitted, whereby, after the lower piston half is fitted onto the seated lower retaining ring segments the seal is fitted onto the rod end and moved therealong into engagement with said lower piston half, with the upper piston half then fitted over and is moved therealong, passed the upper retaining ring groove and into engagement with said seal; the upper retaining ring segments are then fitted into said retaining ring groove and said upper piston half is moved thereover; the spacing ring formed as a pair of ring segments is fitted between the opposing surfaces of the upper and lower piston halves; and the seal is moved over the spacing ring in anticipation of the upper and lower piston bearings being fitted to said upper and lower piston halves.

16. A method as recited in claim 15, wherein the piston spacer is formed in two sections that, when fitted together form a ring.

17. A method as recited in claim 15, further including forming a pair of spaced apart O-ring grooves in the rod between the retaining ring grooves; and fitting an O-ring fitted in each said O-ring groove before the lower retaining ring is seated in the lower retaining ring groove.

18. A method as recited in claim 15, wherein outwardly extending steps are formed in the upper and lower piston halves, and the upper and lower piston bearings are each stepped inwardly around their inner surface to receive the respective upper and lower piston halves seated therein when each said piston bearing closes around said upper and lower piston half.

19. A method as recited in claim 14, wherein the retaining ring segments are formed as half rings from plastic, aluminum or steel.

* * * * *